US008819166B2

(12) United States Patent
Ahn et al.

(10) Patent No.: US 8,819,166 B2
(45) Date of Patent: *Aug. 26, 2014

(54) METHOD AND APPARATUS FOR MANAGING BOOKMARK INFORMATION FOR CONTENT STORED A NETWORKED MEDIA SERVER

(75) Inventors: Sung Joon Ahn, Kyunggi-do (KR); Chang Hyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 60 days.

This patent is subject to a terminal disclaimer.

(21) Appl. No.: 12/774,690

(22) Filed: May 5, 2010

(65) Prior Publication Data
US 2010/0217754 A1    Aug. 26, 2010

Related U.S. Application Data

(63) Continuation of application No. 11/120,930, filed on May 2, 2005, now Pat. No. 8,010,620.

(30) Foreign Application Priority Data

May 3, 2004    (KR) .......................... 10-2004-0031151

(51) Int. Cl.
*G06F 15/16* (2006.01)

(52) U.S. Cl.
USPC ........... 709/217; 709/203; 709/219; 715/203; 715/206; 725/101

(58) Field of Classification Search
USPC .......... 709/217, 203, 219, 231; 715/201, 202, 715/203, 206, 716; 725/101, 136, 139
See application file for complete search history.

(56) References Cited

U.S. PATENT DOCUMENTS

| | | | | |
|---|---|---|---|---|
| 5,524,193 A | * | 6/1996 | Covington et al. | 715/210 |
| 5,655,117 A | * | 8/1997 | Goldberg et al. | 1/1 |
| 5,778,381 A | | 7/1998 | Sandifer | |
| 5,922,045 A | * | 7/1999 | Hanson | 709/206 |
| 6,037,934 A | | 3/2000 | Himmel et al. | |
| 6,041,360 A | | 3/2000 | Himmel et al. | |
| 6,064,380 A | * | 5/2000 | Swenson et al. | 715/273 |

(Continued)

FOREIGN PATENT DOCUMENTS

| | | |
|---|---|---|
| JP | 2001-209602 | 8/2001 |
| KR | 2000-0058779 | 10/2000 |

(Continued)

OTHER PUBLICATIONS

Ritchie, John. "MediaRenderer:1 Device Template Version 1.01", Jun. 25, 2002, p. 1-12.*

(Continued)

*Primary Examiner* — Jimmy H Tran
(74) *Attorney, Agent, or Firm* — Lee, Hong, Degerman, Kang & Waimey

(57) ABSTRACT

A method and apparatus for managing bookmark information of a media server through a network based on the UPnP AV standard is disclosed. If a request for bookmarking a content item is made, a bookmark item is created and the created bookmark item is linked to the content item by adding the ID of the created bookmark item to the property information of the content item and recording the ID of the content item to be bookmarked in the created bookmark item.

4 Claims, 3 Drawing Sheets

(56) References Cited

U.S. PATENT DOCUMENTS

| | | | |
|---|---|---|---|
| 6,144,380 A * | 11/2000 | Shwarts et al. | 715/863 |
| 6,173,317 B1 * | 1/2001 | Chaddha et al. | 709/219 |
| 6,178,440 B1 * | 1/2001 | Foster et al. | 709/201 |
| 6,185,588 B1 * | 2/2001 | Olson-Williams et al. | 715/236 |
| 6,202,025 B1 * | 3/2001 | Harada | 340/995.18 |
| 6,211,871 B1 | 4/2001 | Himmel et al. | |
| 6,219,679 B1 * | 4/2001 | Brisebois et al. | 715/206 |
| 6,289,346 B1 * | 9/2001 | Milewski et al. | 1/1 |
| 6,332,144 B1 * | 12/2001 | deVries et al. | 1/1 |
| 6,360,057 B1 * | 3/2002 | Tsumagari et al. | 386/241 |
| 6,460,038 B1 * | 10/2002 | Khan et al. | 1/1 |
| 6,480,669 B1 * | 11/2002 | Tsumagari et al. | 386/248 |
| 6,484,156 B1 * | 11/2002 | Gupta et al. | 707/802 |
| 6,492,998 B1 * | 12/2002 | Kim et al. | 715/723 |
| 6,496,829 B1 | 12/2002 | Nakamura | |
| 6,519,764 B1 * | 2/2003 | Atkinson et al. | 717/120 |
| 6,526,424 B2 | 2/2003 | Kanno et al. | |
| 6,543,053 B1 * | 4/2003 | Li et al. | 725/88 |
| 6,546,393 B1 | 4/2003 | Khan | |
| 6,556,773 B2 * | 4/2003 | Tsumagari et al. | 386/241 |
| 6,556,774 B2 * | 4/2003 | Tsumagari et al. | 386/241 |
| 6,564,008 B2 * | 5/2003 | Tsumagari et al. | 386/241 |
| 6,574,421 B2 * | 6/2003 | Tsumagari et al. | 386/241 |
| 6,584,277 B2 * | 6/2003 | Tsumagari et al. | 386/241 |
| 6,601,173 B1 | 7/2003 | Mohler | |
| 6,628,892 B2 * | 9/2003 | Tsumagari et al. | 386/241 |
| 6,647,389 B1 * | 11/2003 | Fitch et al. | 1/1 |
| 6,654,933 B1 * | 11/2003 | Abbott et al. | 715/203 |
| 6,678,700 B1 * | 1/2004 | Moore et al. | 1/1 |
| 6,725,227 B1 * | 4/2004 | Li | 1/1 |
| 6,798,976 B2 * | 9/2004 | Tsumagari et al. | 386/241 |
| 6,842,782 B1 * | 1/2005 | Malik et al. | 709/224 |
| 6,868,225 B1 * | 3/2005 | Brown et al. | 386/239 |
| 6,892,304 B1 | 5/2005 | Galasso et al. | |
| 6,944,391 B2 * | 9/2005 | Tsumagari et al. | 386/241 |
| 6,950,861 B1 | 9/2005 | Amro et al. | |
| 6,981,210 B2 | 12/2005 | Peters et al. | |
| 6,988,245 B2 * | 1/2006 | Janevski | 715/723 |
| 6,990,671 B1 * | 1/2006 | Evans et al. | 719/318 |
| 6,992,687 B1 * | 1/2006 | Baird et al. | 715/805 |
| 6,996,329 B2 * | 2/2006 | Tsumagari et al. | 386/241 |
| 7,032,177 B2 * | 4/2006 | Novak et al. | 715/723 |
| 7,143,353 B2 * | 11/2006 | McGee et al. | 715/723 |
| 7,167,901 B1 | 1/2007 | Beadle et al. | |
| 7,194,677 B2 * | 3/2007 | Rizk et al. | 715/205 |
| 7,222,154 B2 * | 5/2007 | Dowling | 709/203 |
| 7,243,111 B2 * | 7/2007 | Nesvadba et al. | 707/693 |
| 7,257,598 B2 | 8/2007 | Toivonen et al. | |
| 7,269,604 B2 * | 9/2007 | Moore et al. | 1/1 |
| 7,272,296 B2 * | 9/2007 | Mears et al. | 386/297 |
| 7,277,928 B2 | 10/2007 | Lennon | |
| 7,286,747 B1 * | 10/2007 | Lewis et al. | 386/282 |
| 7,289,812 B1 * | 10/2007 | Roberts et al. | 455/456.1 |
| 7,319,806 B1 * | 1/2008 | Willner et al. | 386/248 |
| 7,320,137 B1 * | 1/2008 | Novak et al. | 725/134 |
| 7,324,997 B2 * | 1/2008 | Yamada | 1/1 |
| 7,392,481 B2 * | 6/2008 | Gewickey et al. | 715/716 |
| 7,406,656 B2 * | 7/2008 | Schroeder | 715/205 |
| 7,434,219 B2 | 10/2008 | De Meno et al. | |
| 7,454,515 B2 * | 11/2008 | Lamkin et al. | 709/232 |
| 7,496,845 B2 * | 2/2009 | Deutscher et al. | 715/726 |
| 7,506,022 B2 * | 3/2009 | Wang et al. | 709/203 |
| 7,546,022 B2 * | 6/2009 | Sawada | 386/241 |
| 7,564,956 B2 * | 7/2009 | Holtzberg | 379/88.25 |
| 7,584,290 B2 * | 9/2009 | Ruskin et al. | 709/231 |
| 7,602,379 B2 * | 10/2009 | Lemon | 345/173 |
| 7,616,946 B2 * | 11/2009 | Park et al. | 455/414.1 |
| 7,623,824 B2 * | 11/2009 | Anttila et al. | 455/3.06 |
| 7,624,337 B2 * | 11/2009 | Sull et al. | 715/201 |
| 7,636,705 B2 * | 12/2009 | Kim | 1/1 |
| 7,672,864 B2 * | 3/2010 | Nair et al. | 705/7.32 |
| 7,725,919 B1 * | 5/2010 | Thiagarajan et al. | 725/139 |
| 7,774,797 B2 * | 8/2010 | Evans et al. | 719/328 |
| 7,801,850 B2 * | 9/2010 | Moore et al. | 707/610 |
| 7,836,473 B2 | 11/2010 | Tecot et al. | |
| 7,849,160 B2 * | 12/2010 | Hayward | 709/219 |
| 7,890,599 B2 * | 2/2011 | Kalmanje et al. | 709/217 |
| 7,904,797 B2 * | 3/2011 | Wong et al. | 715/200 |
| 7,937,702 B2 | 5/2011 | De Meno et al. | |
| 7,958,093 B2 * | 6/2011 | Anderson et al. | 707/662 |
| 8,001,077 B2 | 8/2011 | Kelley et al. | |
| 8,010,579 B2 * | 8/2011 | Metsatshti et al. | 707/805 |
| 8,010,620 B2 * | 8/2011 | Ahn et al. | 709/217 |
| 8,015,170 B2 | 9/2011 | Badros et al. | |
| 8,028,037 B2 * | 9/2011 | Ahn et al. | 709/217 |
| 8,065,335 B2 * | 11/2011 | Min et al. | 707/793 |
| 8,112,702 B2 | 2/2012 | Badoiu et al. | |
| 8,126,897 B2 * | 2/2012 | Sznajder et al. | 707/742 |
| 8,150,830 B2 | 4/2012 | Badros et al. | |
| 8,156,528 B2 | 4/2012 | Baumgartner et al. | |
| 8,166,017 B2 | 4/2012 | Badros et al. | |
| 8,209,397 B2 | 6/2012 | Ahn et al. | |
| 8,214,463 B2 | 7/2012 | Ahn et al. | |
| 8,214,519 B2 | 7/2012 | Ahn et al. | |
| 8,224,925 B2 | 7/2012 | Ahn et al. | |
| 8,266,244 B2 | 9/2012 | Ahn et al. | |
| 8,275,854 B2 | 9/2012 | Ahn et al. | |
| 8,281,345 B2 | 10/2012 | Baumgartner et al. | |
| 8,312,435 B2 | 11/2012 | Wygodny et al. | |
| 8,352,583 B2 | 1/2013 | Ahn et al. | |
| 8,364,779 B2 | 1/2013 | Ahn et al. | |
| 8,380,811 B2 | 2/2013 | Ahn et al. | |
| 8,381,109 B2 | 2/2013 | Ahn et al. | |
| 8,391,110 B2 | 3/2013 | Tanaka et al. | |
| 8,407,596 B2 | 3/2013 | Yu et al. | |
| 8,458,288 B2 | 6/2013 | Ahn et al. | |
| 8,505,010 B2 | 8/2013 | De Meno et al. | |
| 8,549,102 B2 | 10/2013 | Ahn et al. | |
| 8,612,415 B2 | 12/2013 | Badros et al. | |
| 2001/0011285 A1 | 8/2001 | Kanno et al. | |
| 2001/0032234 A1 * | 10/2001 | Summers et al. | 709/201 |
| 2001/0034734 A1 * | 10/2001 | Whitley et al. | 707/104.1 |
| 2002/0069218 A1 * | 6/2002 | Sull et al. | 707/501.1 |
| 2002/0076014 A1 * | 6/2002 | Holtzberg | 379/88.23 |
| 2002/0078144 A1 * | 6/2002 | Lamkin et al. | 709/203 |
| 2002/0083035 A1 * | 6/2002 | Pearl et al. | 707/1 |
| 2002/0091675 A1 * | 7/2002 | Shimokawa et al. | 707/1 |
| 2002/0091836 A1 | 7/2002 | Moetteli | |
| 2002/0116525 A1 | 8/2002 | Peters et al. | |
| 2002/0129164 A1 | 9/2002 | Van Der Meulen et al. | |
| 2002/0135608 A1 * | 9/2002 | Hamada et al. | 345/723 |
| 2002/0152267 A1 | 10/2002 | Lennon | |
| 2002/0159640 A1 * | 10/2002 | Vaithilingam et al. | 382/218 |
| 2002/0163532 A1 * | 11/2002 | Thomas et al. | 345/723 |
| 2002/0174430 A1 * | 11/2002 | Ellis et al. | 725/46 |
| 2002/0174433 A1 | 11/2002 | Baumgartner et al. | |
| 2002/0194608 A1 * | 12/2002 | Goldhor | 725/91 |
| 2003/0028892 A1 * | 2/2003 | Gewickey et al. | 725/110 |
| 2003/0046290 A1 * | 3/2003 | Yamada | 707/10 |
| 2003/0052918 A1 * | 3/2003 | Drane et al. | 345/764 |
| 2003/0078986 A1 * | 4/2003 | Ayres et al. | 709/217 |
| 2003/0088422 A1 * | 5/2003 | Denenberg et al. | 704/275 |
| 2003/0122966 A1 * | 7/2003 | Markman et al. | 348/563 |
| 2003/0126599 A1 * | 7/2003 | Novak et al. | 725/32 |
| 2003/0144984 A1 * | 7/2003 | Dunbar | 707/1 |
| 2003/0229900 A1 * | 12/2003 | Reisman | 725/87 |
| 2004/0003403 A1 * | 1/2004 | Marsh | 725/53 |
| 2004/0008970 A1 * | 1/2004 | Junkersfeld et al. | 386/69 |
| 2004/0018000 A1 * | 1/2004 | Mears et al. | 386/69 |
| 2004/0043758 A1 | 3/2004 | Sorvari et al. | |
| 2004/0044745 A1 * | 3/2004 | Shimizu et al. | 709/217 |
| 2004/0073610 A1 * | 4/2004 | Terada et al. | 709/203 |
| 2004/0073713 A1 * | 4/2004 | Pentikainen et al. | 709/249 |
| 2004/0139047 A1 * | 7/2004 | Rechsteiner et al. | 707/1 |
| 2004/0165483 A1 * | 8/2004 | Unger | 369/30.09 |
| 2004/0220926 A1 * | 11/2004 | Lamkin et al. | 707/3 |
| 2004/0223737 A1 * | 11/2004 | Johnson | 386/68 |
| 2004/0230636 A1 * | 11/2004 | Masuoka et al. | 708/800 |
| 2004/0236774 A1 * | 11/2004 | Baird et al. | 707/100 |
| 2005/0047756 A1 * | 3/2005 | Evans | 386/95 |
| 2005/0049500 A1 * | 3/2005 | Babu et al. | 600/443 |
| 2005/0081159 A1 * | 4/2005 | Gupta et al. | 715/751 |
| 2005/0097623 A1 * | 5/2005 | Tecot et al. | 725/136 |
| 2005/0108233 A1 * | 5/2005 | Metsatahti et al. | 707/9 |

(56) References Cited

U.S. PATENT DOCUMENTS

| | | | |
|---|---|---|---|
| 2005/0114756 A1* | 5/2005 | Lehikoinen et al. | 715/501.1 |
| 2005/0114897 A1* | 5/2005 | Cho et al. | 725/88 |
| 2005/0135341 A1* | 6/2005 | Kim | 370/352 |
| 2005/0155077 A1* | 7/2005 | Lawrence et al. | 725/109 |
| 2005/0172018 A1* | 8/2005 | Devine et al. | 709/223 |
| 2005/0182828 A1* | 8/2005 | Lamkin et al. | 709/219 |
| 2005/0193322 A1* | 9/2005 | Lamkin et al. | 715/500.1 |
| 2005/0198574 A1* | 9/2005 | Lamkin et al. | 715/719 |
| 2005/0204292 A1* | 9/2005 | Kibilov et al. | 715/738 |
| 2005/0210145 A1* | 9/2005 | Kim et al. | 709/231 |
| 2005/0228860 A1 | 10/2005 | Hamynen et al. | |
| 2005/0246622 A1* | 11/2005 | Ahn et al. | 715/500.1 |
| 2005/0251749 A1* | 11/2005 | Lamkin et al. | 715/719 |
| 2005/0265701 A1* | 12/2005 | Lamkin et al. | 386/125 |
| 2005/0278435 A1* | 12/2005 | Lamkin et al. | 709/219 |
| 2005/0278458 A1* | 12/2005 | Berger et al. | 709/248 |
| 2005/0278729 A1* | 12/2005 | Lamkin et al. | 719/328 |
| 2005/0289465 A1* | 12/2005 | Matsuda | 715/716 |
| 2006/0041639 A1* | 2/2006 | Lamkin et al. | 709/219 |
| 2006/0041640 A1* | 2/2006 | Lamkin et al. | 709/219 |
| 2006/0085732 A1* | 4/2006 | Jiang et al. | 715/501.1 |
| 2006/0089981 A1* | 4/2006 | Ahn et al. | 709/221 |
| 2006/0168000 A1* | 7/2006 | Bodlaender | 709/205 |
| 2006/0195513 A1* | 8/2006 | Rogers et al. | 709/203 |
| 2006/0195790 A1* | 8/2006 | Beaupre et al. | 715/727 |
| 2006/0224942 A1* | 10/2006 | Hidesawa et al. | 715/501.1 |
| 2006/0242161 A1* | 10/2006 | Ten Kate et al. | 707/100 |
| 2006/0242306 A1* | 10/2006 | Boro et al. | 709/227 |
| 2006/0242627 A1 | 10/2006 | Wygodny et al. | |
| 2006/0277316 A1* | 12/2006 | Wang et al. | 709/231 |
| 2006/0293991 A1* | 12/2006 | Jenzowsky et al. | 705/35 |
| 2006/0294192 A1* | 12/2006 | Mao et al. | 709/213 |
| 2007/0027926 A1* | 2/2007 | Kinouchi et al. | 707/104.1 |
| 2007/0027949 A1* | 2/2007 | Park et al. | 709/203 |
| 2007/0031109 A1* | 2/2007 | Tsuboi et al. | 386/46 |
| 2007/0033292 A1* | 2/2007 | Sull et al. | 709/238 |
| 2007/0033533 A1* | 2/2007 | Sull | 715/752 |
| 2007/0044010 A1* | 2/2007 | Sull et al. | 715/500.1 |
| 2007/0094376 A1* | 4/2007 | Ahn et al. | 709/223 |
| 2007/0104461 A1* | 5/2007 | Cho | 386/96 |
| 2007/0110397 A1* | 5/2007 | Tanikawa et al. | 386/95 |
| 2007/0136306 A1 | 6/2007 | Kelley et al. | |
| 2007/0244903 A1* | 10/2007 | Ratliff et al. | 707/10 |
| 2007/0250874 A1* | 10/2007 | Howcroft | 725/89 |
| 2008/0163379 A1* | 7/2008 | Robinson et al. | 726/27 |
| 2008/0177994 A1 | 7/2008 | Mayer | |
| 2009/0049118 A1* | 2/2009 | Stevens | 709/203 |
| 2009/0106356 A1* | 4/2009 | Brase et al. | 709/203 |
| 2009/0165036 A1 | 6/2009 | Berry | |
| 2009/0205006 A1* | 8/2009 | Lopez- Estrada | 725/114 |
| 2009/0210779 A1 | 8/2009 | Badoiu et al. | |
| 2009/0228569 A1* | 9/2009 | Kalmanje et al. | 709/217 |
| 2009/0254823 A1* | 10/2009 | Barrett | 715/716 |
| 2009/0319672 A1* | 12/2009 | Reisman | 709/227 |
| 2009/0320073 A1* | 12/2009 | Reisman | 725/51 |
| 2010/0027966 A1* | 2/2010 | Harrang et al. | 386/69 |
| 2010/0036888 A1* | 2/2010 | Carter et al. | 707/200 |
| 2010/0042702 A1* | 2/2010 | Hanses | 709/219 |
| 2010/0042746 A1* | 2/2010 | Keum et al. | 709/245 |
| 2010/0121941 A1* | 5/2010 | Harrang et al. | 709/219 |
| 2010/0217827 A1* | 8/2010 | Ahn et al. | 709/217 |
| 2010/0217828 A1* | 8/2010 | Ahn et al. | 709/217 |
| 2010/0217829 A1* | 8/2010 | Ahn et al. | 709/217 |
| 2010/0217830 A1* | 8/2010 | Ahn et al. | 709/217 |
| 2010/0217831 A1* | 8/2010 | Ahn et al. | 709/217 |
| 2010/0217832 A1* | 8/2010 | Ahn et al. | 709/217 |
| 2010/0217833 A1* | 8/2010 | Ahn et al. | 709/217 |
| 2010/0218079 A1* | 8/2010 | Ahn et al. | 715/206 |
| 2010/0223315 A1 | 9/2010 | Ahn et al. | |
| 2010/0223316 A1* | 9/2010 | Ahn et al. | 709/201 |
| 2010/0223353 A1* | 9/2010 | Ahn et al. | 709/217 |
| 2010/0241703 A1* | 9/2010 | Ahn et al. | 709/203 |
| 2010/0241704 A1* | 9/2010 | Ahn et al. | 709/203 |
| 2010/0241706 A1* | 9/2010 | Ahn et al. | 709/203 |
| 2010/0241735 A1* | 9/2010 | Ahn et al. | 709/219 |
| 2010/0250667 A1* | 9/2010 | Ahn et al. | 709/203 |
| 2010/0310227 A1 | 12/2010 | Baumgartner et al. | |
| 2010/0313238 A1 | 12/2010 | Baumgartner et al. | |
| 2011/0029597 A1* | 2/2011 | Morinaga | 709/203 |
| 2011/0047571 A1* | 2/2011 | Zhang et al. | 725/40 |
| 2011/0078234 A1* | 3/2011 | Engel | 709/203 |
| 2011/0131332 A1* | 6/2011 | Bouazizi | 709/227 |
| 2011/0137976 A1* | 6/2011 | Poniatowski et al. | 709/203 |
| 2011/0158606 A1* | 6/2011 | Lin et al. | 386/248 |
| 2011/0314502 A1* | 12/2011 | Levy et al. | 725/46 |
| 2012/0011551 A1* | 1/2012 | Levy et al. | 725/82 |
| 2012/0102387 A1 | 4/2012 | Badoiu et al. | |

FOREIGN PATENT DOCUMENTS

| | | |
|---|---|---|
| KR | 2001-0107082 | 7/2001 |
| KR | 2003-0004926 | 1/2003 |
| KR | 2003-0097095 | 12/2003 |
| WO | 00-58967 | 10/2000 |
| WO | 02-102079 | 12/2002 |

OTHER PUBLICATIONS

Ritchie J., et al.; "UPnP AV Architecture: 0.83, For Universal Plug and Play Version 1.0"; Jun. 12, 2002; XP-002271673.

Greer, T., et al.; "Adobe: Acrobat—Programmatically Insert Bookmark, thread 223-639638"; Aug. 27, 2003; XP002426873.

Ritchie J., et al.; "UPnP AV Architecture: 1, For Universal Plug and Play Version 1.0"; Jun. 25, 2002.

Debique, K., et al.; "Content Directory: 1 Service Template Version 1.01"; Jun. 25, 2002.

United States Patent and Trademark Office U.S. Appl. No. 12/773,812, Office Action dated Sep. 11, 2013, 15 pages.

United States Patent and Trademark Office U.S. Appl. No. 12/778,035, Office Action dated Sep. 6, 2013, 28 pages.

Ritchie, "MediaRenderer:1 Device Template Version 1.01," Jun. 2002, 12 pages.

United States Patent and Trademark Office U.S. Appl. No. 12/774,673, Office Action dated May 8, 2013, 14 pages.

United States Patent and Trademark Office U.S. Appl. No. 12/778,053, Office Action dated Sep. 19, 2013, 39 pages.

United States Patent and Trademark Office U.S. Appl. No. 12/792,446, Office Action dated Nov. 20, 2013, 11 pages.

United States Patent and Trademark Office U.S. Appl. No. 12/773,805, Office Action dated Jan. 27, 2014, 22 pages.

* cited by examiner

METHOD AND APPARATUS FOR MANAGING BOOKMARK INFORMATION FOR CONTENT STORED A NETWORKED MEDIA SERVER

CROSS-REFERENCE TO RELATED APPLICATIONS

This application is a continuation of U.S. application Ser. No. 11/120,930, filed May 2, 2005, now U.S. Pat. No. 8,010,620, which pursuant to 35 U.S.C. §119(a), claims the benefit of earlier filing date and right of priority to Korean Application No. 10-2004-0031151, filed on May 3, 2004, the contents of which are hereby incorporated by reference herein in their entirety.

BACKGROUND OF THE INVENTION

1. Field of the Invention

The present invention relates to bookmarking a content object and, more particularly, but not by way of limitation, to a method and apparatus for managing bookmark information for content objects stored in a media server through a network based on the UPnP AV standard.

2. Description of the Related Art

As the computing power of small devices improves, various inexpensive and universal networking techniques are appearing and being commercialized.

With the addition of Plug and Play (PnP) capabilities to the PC operating system it became a great deal easier to setup, configure, and add peripherals to a PC.

Universal Plug and Play (UPnP) is an extension of the PnP technique to the entire network with a view to enabling discovery and control of networked devices and services, such as network-attached printers, Internet gateways, and consumer electronics equipment. The UPnP is based upon Internet technologies such as TCP/IP, HTTP, and XML.

The UPnP AV architecture defines three main logical entities: a media server (MS), a media renderer (MR), and an AV control point (CP). The media server (MS) has access to entertainment content and can send that content to another UPnP AV device via the network. The media renderer (MR) is able to receive external content from the network and render it on its local hardware. The AV control point (CP) coordinates the operation of the media server (MS) and the media renderer (MR).

In the UPnP architecture, each time a UPnP action such as a browsing action from the AV control point (CP) comes in, the media server (MS) exposes information on its content. The content selected through the user interface of the AV control point (CP) is transferred to the media renderer (MR) from the media server (MS) using a streaming technique and played by the media renderer (MR).

The playback of the content can be stopped by user's request while the content is being played and then resumed afterward. For example, a user may turn off an MP3 player while listening to music and want to resume playing of the music from the stopped position later. Similarly, a user may stop a DVD player while watching a DVD movie and want to resume the movie from the stopped position later. To this end, content players automatically store information about the state of the content being played when power is turned off or playback is stopped. Such a function is called automatic bookmarking.

Generally, bookmarking refers to storing the URL (uniform resource locator) of a web page that you visit using a web browser such as the Netscape navigator so that you can revisit the page easily at a later time. Once the URL of a web page is stored in the bookmark, the user can select the URL from the bookmark to visit the web page without entering the URL.

The media server in a home network can store a lot of contents, i.e., media files and can provide the same content to a plurality of users simultaneously through the network. The simple bookmarking function which stores the position at which the playing of the content is stopped is not appropriate when a plurality of users are playing the same content. The media server, therefore, requires an improved bookmarking function.

SUMMARY OF THE INVENTION

In view of the shortcomings of the prior art, it is an object of the present invention to provide a method and apparatus that allows a plurality of users to bookmark contents stored in a media server individually.

It is another object of the invention to provide a method and apparatus that allows individual bookmarking of media contents based on the UPnP AV standard.

According to the present invention, if a request for bookmarking a content object is received, a bookmark object is created and an ID of the created bookmark object is added to property information of the content object.

According to the present invention, when a bookmark object is created, the ID of the content object to be bookmarked is included in the created bookmark object.

In one embodiment of the invention, the directory for storing bookmark objects is separated from the directory for storing content objects.

In another embodiment, bookmark objects are stored in a container placed in the directory for storing content objects.

In one embodiment of the invention, a bookmark object comprises a bookmark object ID for uniquely identifying the bookmark object, an ID of the bookmarked object, a title written in a user-readable format, a bookmark object class, a UDN for storing the ID of rendering control service (RenderingControl Service) and/or the ID of AVTransport service (AVTS) of a media renderer which was presenting the bookmarked object, and a list of state variables for storing the state variables of the RenderingControl service and AVTransport service.

In one embodiment of the invention, if a content object is bookmarked, a bookmark object is created and the ID thereof is added to metadata indicating the property of the bookmarked object.

In one embodiment of the invention, if a request for bookmarking a content is received, the control point sends a request for creating a bookmark to the media server. Receiving the request, the media server creates a bookmark object based upon the received information and adds the ID of the created bookmark object to metadata of the content object to be bookmarked.

In another embodiment of the invention, if a request for bookmarking a content is received, the control point sends a request for creating a bookmark to the media server. Receiving the request, the media server creates a bookmark object and sends the ID of the created object to the control point. The control point adds the ID of the bookmark object to metadata of the content object to be bookmarked and requests the media server to update metadata of the content object.

In one embodiment of the invention, the ID of a created bookmark object is determined according to a rule defined by the media server storing content objects.

In one embodiment of the invention, the class of the bookmark object is defined to "object.item.bookmarkitem".

BRIEF DESCRIPTION OF THE DRAWINGS

The above features and other advantages of the present invention will be more clearly understood from the following detailed description taken in conjunction with the accompanying drawings, in which.

DETAILED DESCRIPTION OF THE PREFERRED EMBODIMENTS

In order that the invention may be fully understood, preferred embodiments thereof will now be described with reference to the accompanying drawings.

The preferred embodiments of the present invention satisfy the following conditions for implementing a bookmark functionality based upon the UPnP AV standard.

Every object provided by the media server in the UPnP AV architecture can be bookmarked.

Because it is not that the media server provides only a single content to users, contents can be bookmarked individually.

One content can be bookmarked at several different locations within the content.

The list of saved bookmarks can be displayed to allow a bookmark can be selected therefrom.

Information on all of the saved bookmarks can be provided to the users and all of the bookmarks are placed in a single container for making it easy to select one bookmark from among the bookmarks.

Because the number of bookmarks that can be displayed may be limited, information specifying the number of bookmarks to be displayed can be provided.

Information on the starting index specifying the starting position for searching bookmarks can be provided.

Information on the number of the saved bookmarks can be provided.

If a bookmark is selected, content can be played or removed using the information of the selected bookmark.

Figure 2:
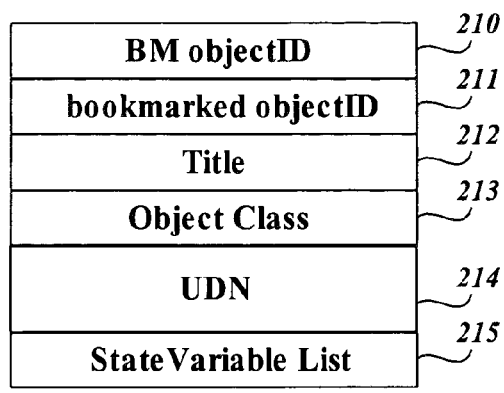
FIG. 2 illustrates a bookmark object structure in accordance with the present invention.

FIG. 2 illustrates a bookmark object structure in accordance with the present invention. The structured bookmark objects are stored in a particular container of the media server.

The bookmark object structure shown in FIG. 2 contains a bookmark ID for uniquely identifying a bookmark object (BM objectID) 210, a unique ID of a bookmarked object (Bookmarked ObjectID) 211, a bookmark title written in a user-readable format (e.g., character string) (Title) 212, a bookmark object class (Object Class) 213, a unique device number (UDN) for storing the ID of the rendering control service (RenderingControl Service) and/or the ID of the AVTransport service (AVTS) of the renderer that is presenting the bookmarked object 214, and a list of state variables for storing the RenderingControl service state variables (e.g., sound volume or luminance) and the AVTS state variables (e.g., presentation time) (State Variable List) 215. For example, the bookmark object class 213 is newly defined to "object.item.bookmarkitem".

The bookmark object ID (BM objectID) 210 is determined automatically according to a predefined rule when a bookmark object is created. Information to be recorded in the bookmark title (Title) 212, the bookmark object class (Object Class) 213, the unique device number (UDN) 214, and the list of state variables (State Variable List) 215 is provided by the AV control point (CP) when the AV control point (CP) makes a request for the creation of a bookmark. The information to be contained in the list of state variables (State Variable List) 215, etc. is received from the media renderer (MR) and provided to the media server (MR).

The procedure for creating a bookmark object of the above structure and managing the information thereof will now be described in detail.

Figure 3A:
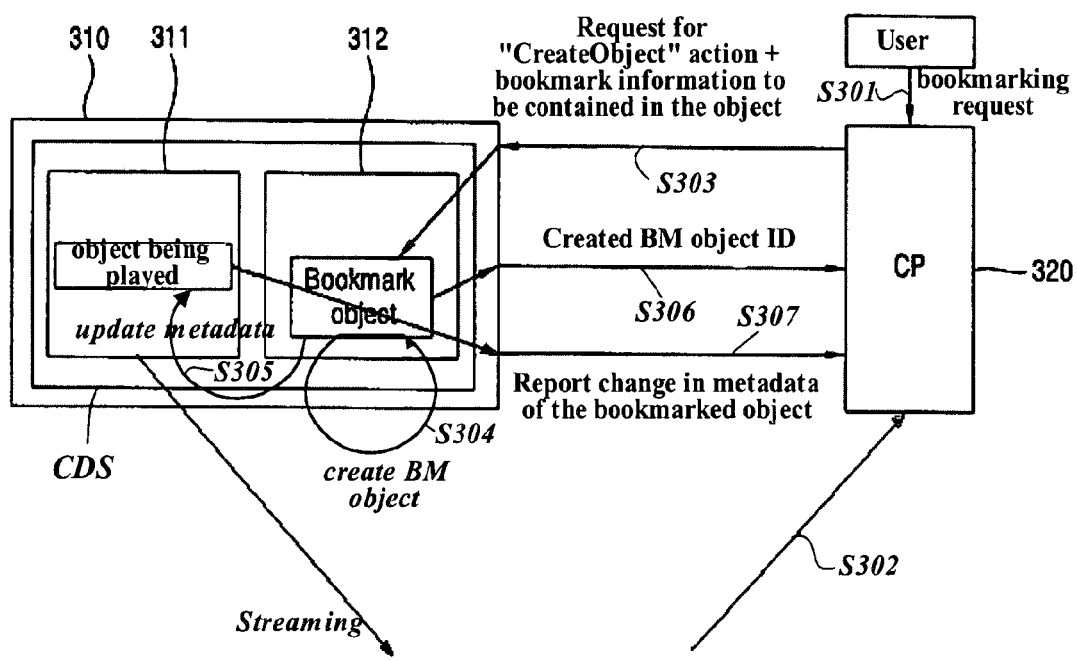
FIGS. 3a and 3b illustrate the procedures for creating a bookmark object according to preferred embodiments of the present invention.

FIG. 3a illustrates the procedure for creating a bookmark in accordance with an embodiment of the present invention, wherein a content object (also called content item) that is currently being played is bookmarked.

If a user makes a request for bookmarking the content 311 that is being played by a media renderer (not illustrated), a bookmark object (also called bookmark item) is created by using "CreateObject" action defined by the UPnP AV standard.

The procedure will be described in more detail. If the user makes a request for bookmarking the content being played, (S301), the control point 320 requests the RenderingControl service and AVTS of the media renderer to provide the state variables for the content and receives the state variables through "GetStateVariables( )" action (S302). The control point 320 is a control application capable of detecting and controlling other devices and/or services. The control point 320 is executed on a device having a user-friendly environment such as a PDA. The control point 302 can be incorporated into the media renderer.

If the streaming from the media server 310 to the media renderer is done in push mode wherein AVIS is executed on the media server 310, the control point 320 receives the state variables of AVTS from the media server 310.

The control point 320 calls "CreateObject action" so that the content directory service (CDS) of the media server 310 creates a bookmark object. Bookmark information to be contained in the bookmark object is also provided as arguments to the action (S303). The bookmark information is information to be recorded in the fields of the ID of the bookmarked object 211, the title 212, the object class 213, the unique device number (UDN) 214, and the list of state variables 215 shown in FIG. 2. The control point 320 delivers the unique device number (UDN) of the RenderingControl service of the media renderer (or the unique device number (UDN) of the AVTS), which was obtained when the control point 320 made connection for transmission of the content currently being streamed, by storing it in the UDN field.

The information to be stored in the title 212 may be organized into a vendor-specific part and a user input part. If the title 212 contains separate room for the user input part, the control point 320 requests the user to enter a desired string for easy identification of the content and transfers the user-entered string to the media server 310 as an input argument to "CreateObject" action. Alternatively, the control point 320 can transfer the title of the object to be bookmarked to the media server 310. The information to be stored in the object class 213 is "object.item.bookmarkitem" as mentioned above. Additional information can be transferred in different embodiments.

"CreateObject" action for creating the bookmark object and input arguments thereof are written in a markup language such as XML and delivered to the media server 310.

Receiving the action, the content directory service (CDS) of the media server 310 creates a bookmark object based on the information contained in the input arguments to the action. The ID of the bookmark object is generated according to a predefined rule and recorded in the bookmark object ID (BM ObjectID) field 210 (S304).

Before creating the bookmark object, the content directory service (CDS) of the media server 310 first determines if bookmark objects having the same information contained in the input arguments to the "CreateObject" action exist. A bookmark object is newly created only when there is no such bookmark.

Figure 1:
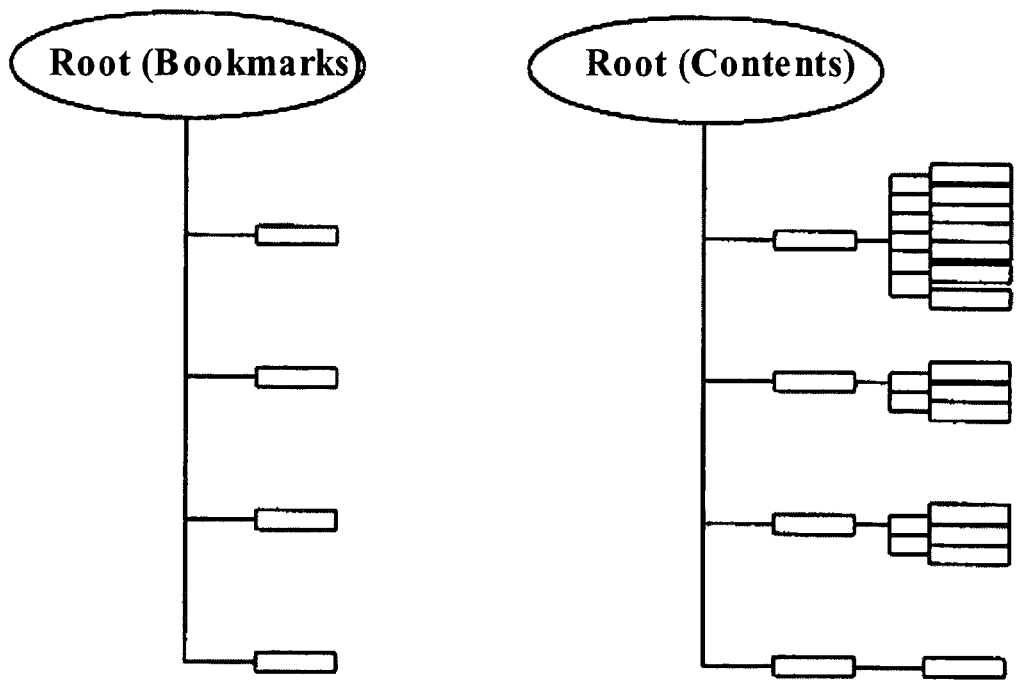
FIG. 1 illustrates a directory structure for storing bookmark objects in accordance with one embodiment of the present invention.

The existing UPnP AV standard requires that every content should be contained in a root object having the ID of "0". In the preferred embodiment of the present invention shown in FIG. 1, however, there is a separate directory structure exclusively for storing bookmark objects. In this embodiment, general browsing actions show only the directory for storing contents. The directory for storing bookmark objects is shown by only special actions. Like the ID of the root object of the content directory, the ID of the root object of the bookmark directory is predefined (e.g., "bookmark_holder").

It is also possible to place the container for storing bookmark objects in a special container under the root container "0".

If the control point 320 set the parentobjectID to "bookmark_holder" when calling the "CreateObject" action, the content directory service (CDS) of the media server 310 creates the bookmark object under the root container 312 the ID of which is "bookmark_holder".

After creating the bookmark object as described above, the content directory service (CDS) of the media server 310 adds the ID of the created bookmark object to the metadata describing the property of the bookmarked object, i.e., the content being played. In other words, the content directory service (CDS) updates the information about the bookmarked object (S305). The reason for linking the bookmark object and the bookmarked object by storing the ID of the bookmark object in the bookmarked object is to update also the bookmark object linked to the content object when the content object is changed.

For example, if the content object linked to the bookmark object is removed, the bookmark object is not valid any more. In this case, when the content object is removed, the bookmark object linked to the content object is detected using the stored bookmark object ID and the linked bookmark object is removed as well.

After creating the bookmark object and updating the metadata of the linked content object, the content directory service (CDS) of the media server 310 transfers the ID of the created bookmark object and the updated metadata of the content object to the control point 320 (S306 and S307) so that the control point 320 can update its information about objects and bookmarks that have been received through a previous browsing action. The information transfer can be done through a reply to the "CreateObject action for creating the bookmark object or through an event generated by a change in the information about objects managed by the content directory service (CDS).

Figure 3B:
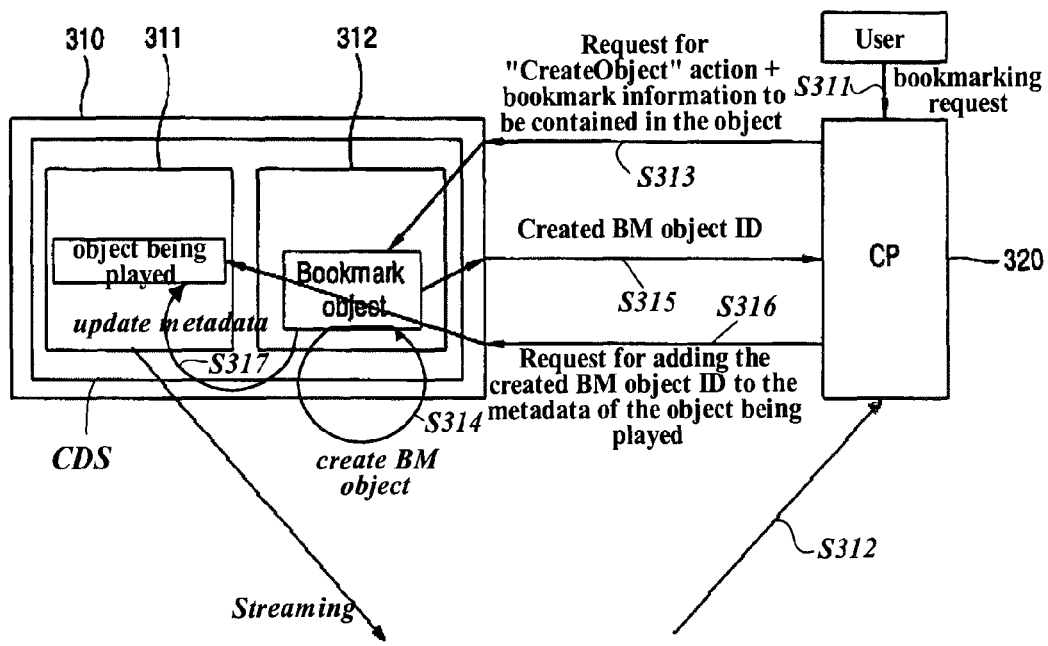

FIG. 3*b* illustrates another embodiment of the present invention. The content directory service (CDS) of the media server 310 creates a requested bookmark object (S314) and transfers the ID of the created bookmark object to the control point 320 (S315). Receiving the ID, the control point 320 constructs complete information on the bookmark object (including the ID) and records the link information for the bookmark object (i.e., the ID of the bookmark object) in the metadata of the content object to be bookmarked. The control point 320 then makes a request for updating the metadata of the content object to the media server 310 (S316) so that the content directory service (CDS) of the media server 310 adds the ID of the bookmark object to the content object (S317), thereby allowing synchronization of data related to the bookmark object.

Figure 4:
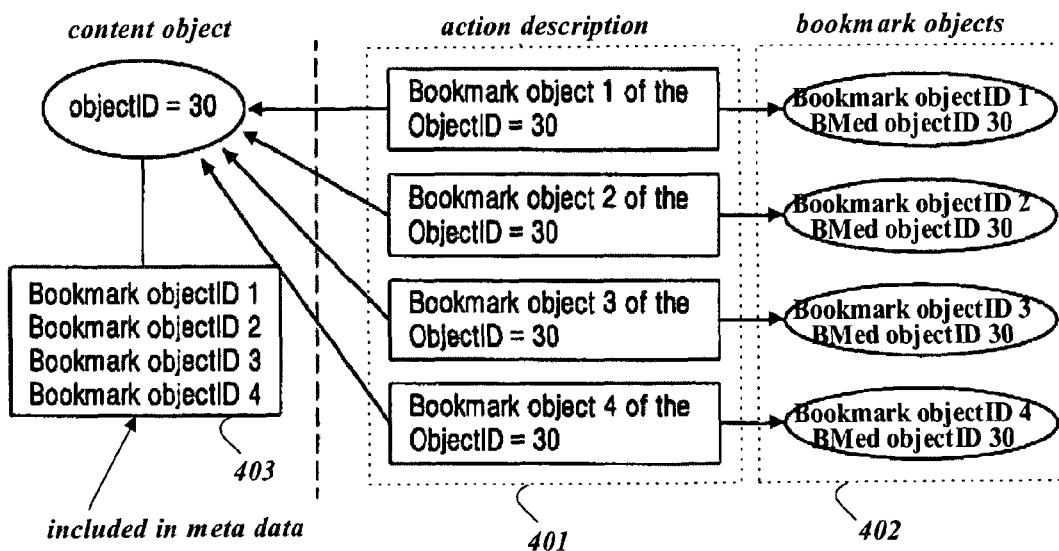
FIG. 4 illustrates the relation between a content object and a plurality of bookmark objects created in accordance with one embodiment of the present invention.

If more than one request for bookmarking one content is received, the media server 310 creates bookmark objects as many as the number of the requests in the corresponding bookmark container as shown in FIG. 4 and records the ID of each of the created bookmark objects in the metadata of the content object.

In the example shown in FIG. 4, a content object having the ID of "30" is linked to 4 bookmark objects (402) generated by 4 bookmarking actions (401). Each of the bookmark objects contains the ID of the linked content object "30". The metadata 403 of the content object also contains the IDs of the 4 linked bookmark objects ("1", "2", "3", and "4").

The procedure for searching bookmarks registered as described above is described below.

To search a bookmark object, the control point 320 makes a request for browse action to the media server 310 with setting the parentobjectID field to "bookmark_holder" (or the ID of the container wherein bookmark objects are stored). If the directory for bookmark objects is separated from the directory for contents, only the bookmark objects are found while the content items and/or containers are found together when the request for "browse" action is made with parentobjectID field set to "0".

The control point 320 may make a request for "browse bookmark" action, which has the same function as "browse" action, to the media server 310 with setting the root ID to "0" instead of setting to the root ID of the bookmark object directory structure (e.g., "bookmark_holder"). If "browse bookmark" action is requested, the content directory service (CDS) of the media server 310 interprets the value of the parentobjectID field which is set to "0" as the root ID of the bookmark object directory structure (e.g., "bookmark_holder") and searches the child items, i.e., bookmark objects, wherein the parentobjectID is delivered as an input argument to the action. The detected bookmark objects are transferred to the control point 320 as the result of "browse bookmark" action.

The syntax for specifying the number of bookmark objects to retrieve and from which object the search operation starts in "browse bookmark" action is the same as the syntax of "browse" action.

To delete a bookmark object, "DestroyObject" action is used with the same syntax for deleting a content object. When a bookmark object is deleted, the content directory service (CDS) of the media server 310 removes the ID of the bookmark object from the metadata of the bookmarked object linked to the bookmark object. The updated object information is provided to the control point 320 in an appropriate manner so that media server 310 and the control point 310 can synchronize their object information.

The present invention allows a user to bookmark content objects as many as required at any position, thereby providing a more convenient environment for playing contents.

The present invention automatically executes editing operations required for management of bookmarks and contents by effectively linking created bookmarks and content objects, thereby facilitating the bookmark management.

While the invention has been disclosed with respect to a limited number of embodiments, those skilled in the art, having the benefit of this disclosure, will appreciate numerous modifications and variations therefrom. It is intended that all such modifications and variations fall within the spirit and scope of the invention.

What is claimed is:

1. A method for managing a bookmark item and a content item, the method performed by a server and comprising:
receiving, from a control device, a creating request for creating the bookmark item using a rendering state variable and a transporting state variable,
wherein the bookmark item is created and the created bookmark item includes a bookmark identifier (ID) and a content ID of the content item for associating the bookmark item with the content item, the rendering state variable, the transporting state variable and a service ID, and
wherein the content item indicates audio/video (AV) data to be bookmarked for reproduction by a media device and is updated to include the bookmark ID of the created bookmark item that is associated with the content item;
receiving, from the control device, a deleting request instructing the server to perform a bookmark deleting operation;
performing the bookmark deleting operation, wherein the bookmark deleting operation comprises:
deleting the bookmark item corresponding to the deleting request; and
updating the associated content item by removing the bookmark ID from the associated content item when the bookmark item is deleted,
wherein the bookmark item is used for recovering the rendering state variable and the transporting state variable associated with playback of the content item,
wherein the rendering state variable is associated with a rendering control service and includes at least audio volume or display luminance,
wherein the transporting state variable is associated with an AV transport service and includes at least presentation time,
wherein the service ID identifies the rendering control service and the AV transport service, and
wherein the content item is stored in the server.

2. The method of claim 1, wherein the bookmark ID is generated by the server.

3. A server for managing a bookmark item and a content item, the server comprising:
an interfacing device configured to at least transmit or receive data; and
a control device configured to:
receive, via the interface device, a creating request for creating the bookmark item using a rendering state variable and a transporting state variable,
wherein the bookmark item is created and the created bookmark item includes a bookmark identifier (ID) and a content ID of the content item for associating the bookmark item with the content item, the rendering state variable, the transporting state variable and a service ID, and
wherein the content item indicates audio/video (AV) data to be bookmarked for reproduction by a media device and is updated to include the bookmark ID of the created bookmark item that is associated with the content item; and
receive, via the interface unit, a deleting request from a controller, the deleting request instructing the server to perform a bookmark deleting operation; and
perform the bookmark deleting operation, wherein the bookmark deleting operation comprises:
deleting the bookmark item corresponding to the deleting request; and
updating the associated content item by removing the bookmark ID from the associated content item when the bookmark item is deleted,
wherein the bookmark item is used for recovering the rendering state variable and the transporting state variable associated with playback of the content item,
wherein the rendering state variable is associated with a rendering control service and includes at least audio volume or display luminance,
wherein the transporting state variable is associated with an AV transport service and includes at least presentation time, wherein the service ID identifies the rendering control service and the AV transport service, and wherein the content item is stored in the server.

4. The server of claim 3, wherein the bookmark ID is generated by the server.

* * * * *